United States Patent [19]
Cohen et al.

[11] 4,136,266
[45] Jan. 23, 1979

[54] TELEPHONE INTRUDER ALERT SYSTEM

[76] Inventors: Eric S. Cohen, 230 Crestwood Dr., South Orange, N.J. 07079; Paul Korwin, 150-09-77 Ave., Flushing, N.Y. 11367

[21] Appl. No.: 879,476

[22] Filed: Feb. 21, 1978

[51] Int. Cl.² ............................................. H04M 1/68
[52] U.S. Cl. ................................. 179/81 E; 179/81 C
[58] Field of Search ................. 179/81 R, 81 C, 81 E, 179/1 MN, 175.2 C

[56] References Cited
U.S. PATENT DOCUMENTS

| | | | |
|---|---|---|---|
| 1,991,383 | 2/1935 | Fator | 179/81 E |
| 2,496,642 | 2/1950 | Shann | 179/81 E |
| 4,031,333 | 6/1977 | Fouratt | 179/81 R |

*Primary Examiner*—Kathleen H. Claffy
*Assistant Examiner*—Joseph A. Popek

*Attorney, Agent, or Firm*—Kirschstein, Kirschstein, Ottinger & Cobrin

[57] ABSTRACT

A telephone intruder alert system is operative for indicating to a current on-line user of a primary extension telephone which is already interconnected with the telephone line of the subsequent interconnection and disconnection of another auxiliary extension telephone with the same telephone line. Electrical click signals of limited time duration are generated each time an extension telephone is interconnected or disconnected with the telephone line, and each click signal is successively detected, filtered and electrically amplified before being conducted to a relay alarm circuit. The first detected click signal indicates the start of the interconnection of the auxiliary extension telephone, and the second detected click signal indicates the end of this interconnection. A timing arrangement energizes and deenergizes the alarm circuit prior to the end of the duration of the first and the second click signals, respectively. A switch selectively disables the intruder alert system.

9 Claims, 5 Drawing Figures

TELEPHONE INTRUDER ALERT SYSTEM

BACKGROUND OF THE INVENTION

1. Field of the Invention

The present invention generally relates to improvements in telephone communication systems having a plurality of extension telephones adapted to be interconnected with the same telephone line and, more particularly, to telephone intruder alert systems for indicating the subsequent interconnection and disconnection of an extension phone with a telephone line to a currrent on-line user.

2. Description of the Prior Art

In conventional telephonic communication systems, extension telephones are usually adapted to be connected in parallel with each other and with a telephone line through appropriate switches located in the base of the respective telephones. That is, an extension telephone is connected with a telephone line simply by removing the receiver from the cradle so that the particular telephone goes "off-hook." The person using the telephone may then place his call and converse with the called party in the conventional manner. Additionally, any one of the other extension telephones may also be connected with the same telephone line by the same procedure (i.e., by removing the receiver of any one of the other extension telephones from its associated cradle). In fact, this type of system has been used extensively for conference calls in which a plurality of people are connected with the called or calling party, as the case may be. However, this same system also provides a means for allowing unauthorized personnel to overhear private conversations. More specifically, someone desiring to eavesdrop on another party's conversation may do so by removing the receiver of any one of the unused extension telephones. Consequently, parties desiring complete telephonic privacy have been forced to use pay phones rather than risk the chance of being overheard, either accidently or otherwise, through an unused extension telephone.

In order to eliminate the possibility of such eavesdropping by unauthorized personnel, the prior art has proposed a multi-element telephone exclusion circuit arrangement which is operative to connect a selected one of a plurality of extension telephones to a telephone line and to automatically exclude all other extension telephones therefrom. Although the proposed telephone exclusion circuit arrangement is generally satisfactory for its intended purpose, it is not altogether practical nor cost effective in practice. The complexity, high cost and maintenance problems associated with a telephone exclusion circuit which is comprised of a large number of parts makes it particularly undesirable for use in the home environment.

SUMMARY OF THE INVENTION

1. Objects of the Invention

Accordingly, it is the general object of the present invention to overcome the above-identified drawbacks of the prior art.

A further object of the present invention is to provide a reliable, simple-to-manufacture, inexpensive telephone intruder alert system for indicating the subsequent interconnection and disconnection of an extension telephone with a telephone line to a current on-line user.

A further object of the present invention is to provide an intruder alert system of the type described which is compatible for use with existing telephone systems having a plurality of extension telephones.

A further object of this invention is to preserve the advantage of use of the interconnected phones for intercommunication, as in conference calls, when desired.

A further object of this invention is addition of "alarms" or signaling means to the existing installation without costly modifications of installations or addition of interconnecting wiring.

A further object of this invention is to make possible the use of the signaling device in a selective manner, to switch it on when required and to shut it off when desired.

A further object of this invention is to enable the user to operate the device without the interference with the normal operation of the telephone.

2. Features of the Invention

In keeping with these objects and others which will become apparent hereinafter, one feature of the invention resides in a telephone intruder alert system for indicating the subsequent interconnection and disconnection of an extension telephone with a telephone line to a current on-line user, which comprises means for detecting electrical click signals of limited time duration which are respectively generated in response to interconnection and disconnection of an auxiliary extension telephone with a telephone line, and means responsive to the detection of the electrical click signals for indicating to a current on-line user of a primary extension telephone which is already interconnected with the telephone line of the subsequent interconnection and disconnection of the auxiliary extension telephone.

In accordance with the invention, the detecting means includes a detector circuit, means for electromagnetically coupling the generated electrical click signal to the detector circuit, means for filtering the coupled electrical click signals from other extraneous signals, and means for electrically amplifying the filtered electrical click signals.

In further accordance with the present invention, the indicating means includes an actuatable indicator, and means for actuating the indicator between alarm and non-alarm states in which the indicator respectively indicates the start and termination of the interconnection of the auxiliary extension telephone in response to respective detection of a first and of a second subsequent electrical click signal.

Another feature of the present invention is embodied in timing means which is operative for actuating the indicator to the alarm state prior to the end of the duration of the first electrical click signal, and to the non-alarm state prior to the end of the duration of the second electrical click signal.

According to the above-mentioned features, the on-line user is reliably alerted to the presence of the intruder on the telephone line. The indicator, which may be of the visually- or auditory-indicating type, is operative to alert the on-line user to the start, presence and the end of interconenction of the auxiliary extension telephone into an active phone conversation.

The novel features which are considered as characteristic for the invention are set forth in particular in the appended claims. The invention itself, however, both as to its construction and its method of operation, together with additional objects and advantages thereof, will be best understood from the following description of spe-

DESCRIPTION OF THE PREFERRED EMBODIMENTS

Figure 1:
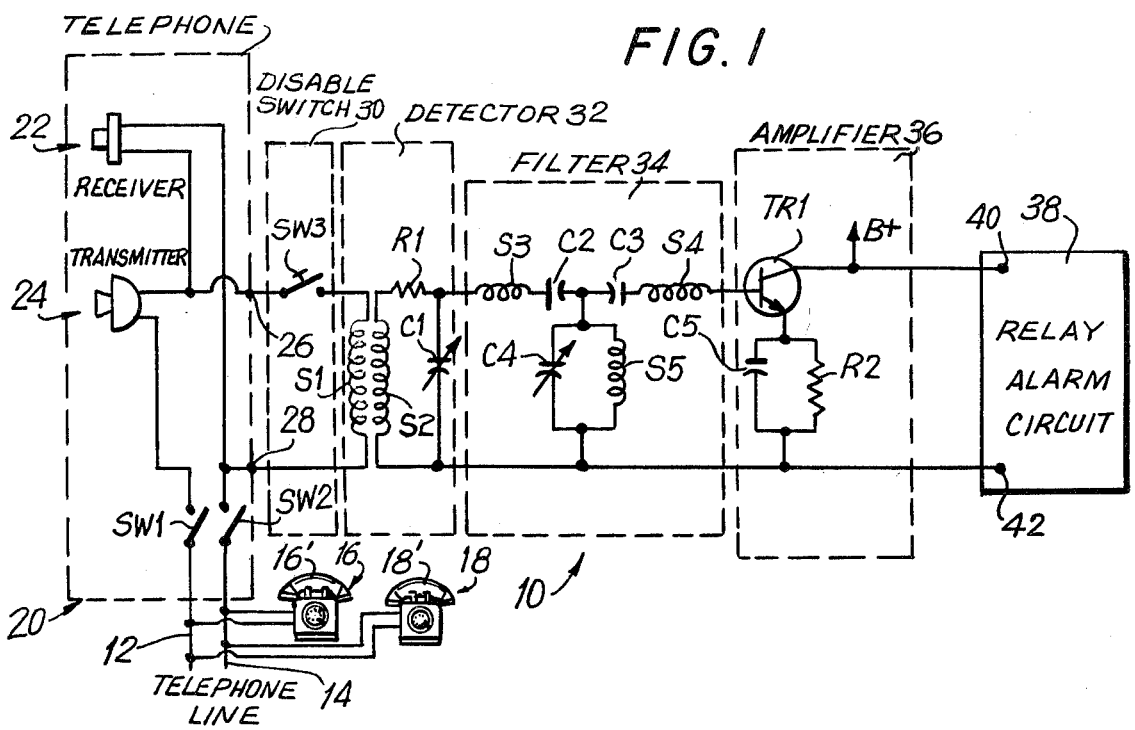
FIG. 1 is a partially schematic representation of a telephone intruder alert system in accordance with the present invention.

Referring now to the drawings, and particularly to FIG. 1 thereof, reference numeral 10 generally identifies a telephone intruder alert system in accordance with the present invention. A pair of telephone lines 12, 14 connected to a non-illustrated telephone terminal station are conducted to a plurality of extension telephones 16, 18, 20.

For purposes of illustration, the system of the present invention is described in conjunction with three extension telephones. However, it is to be noted that this is by way of illustration only and is not to be interpreted as a limitation of the invention. That is, it will be apparent that the system of the present invention may be utilized with any number of extension telephones.

Moreover, extension telephones 16, 18 are shown in pictorial form with hand receivers 16', 18' mounted in their respectively associated cradles; and extension telephone 20 which is analogous to phones 16, 18 is shown in partially diagrammatic, partially schematic wiring circuit form. Extension telephone 20 includes a receiver 22 and a transmitter 24, both generally mounted at opposite end regions of the associated hand receiver of a conventional telephone such as the standard Bell 500 type telephone set. Such standard telephone sets have telephone switches SW1 and SW2 respectively connected in series with tip (T) and ring (R) telephone lines 12, 14.

Telephone output terminals 26, 28 are located on extension telephone 20 downstream of switches SW1, SW2. In conventional operation, when a call is to be completed, the telephone terminal station transmits a ringing current signal at a high voltage level of about 100 volts to the extension telephones to ring their respective bells. During this time, the switches SW1 and SW2 are open, thereby preventing the ringing current from being conducted to system 10 and doing damage to the same. When a user removes the hand receiver from its cradle, the switches SW1 and SW2 close, but simultaneously the ringing current is cut-off and, in its place, the terminal station transmits a modulated low level current signal at about the 5 volt level along the telephone lines 12, 14. The voltage varies with the amplitude of the acoustic signals. The average volt level at the receiver is about 4 volts.

In accordance with the present invention, the system 10 is operative for indicating the subsequent interconnection and/or disconnection of any extension telephone with the telephone line to a current on-line user.

For ease of description, it will be assumed that primary extension telephone 20 is already connected with the telephone line 12, 14 and is currently employed by an on-line user, and further that either or both auxiliary extension telephones 16, 18 are available to be subsequently used by an eavesdropper-intruder. It will be apparent that any one of the extension telephones 16, 18, 20 could be put in first use and, in that case, the remaining extension telephones would be available for a would-be eavesdropper.

The system's operation is based on the discovery that interconnecting or disconnecting an additional auxiliary extension telephone with a telephone line already in use by a primary extension telephone produces so-called "click" signals having distinctive acoustic and electrical properties. More particularly, when a hand receiver of an auxiliary extension phone is removed from its associated cradle, this "off-hook" action produces an electric impulse of limited time duration and generates a characteristic click sound which can be heard in the receiver. This impulse consists of low frequency oscillations and lies typically in the frequency range from 0.1 to about 70 Hz and, more particularly, is on the order of 10 Hz. This impulse is accompanied by a sudden drop in the electric potential of the direct current being supplied on the telephone lines. The voltage potential drop at the receiver has been measured to be about 0.6 volts. Furthermore, when a hand receiver is replaced on its associated cradle, this "on-hook" action generates a similar click signal, except that it is followed by a rise in the supply voltage by about 1.2 to about 1.8 volts.

The invention uses these phenomena to identify and to signal the start, presence and the end of interconnection of an auxiliary extension telephone into an active phone conversation. Each click signal is detected by a detector circuit 32, and the detected click signal is employed to actuate an indicator, preferably of the visually-indicating lamp type or the auditory-indicating buzzer type, to alert the on-line user to the presence of an intruder on the telephone lines.

The detector circuit 32 includes a transfomer means for electromagnetically coupling the click signals generated by removing and/or replacing hand receivers 16', 18' from their associated cradles. The transformer includes induction coil S1 which is connected across output terminals 26, 28. A disabling switch SW3 is connected in series with coil S1 between terminals 26, 28. The disabling switch SW3 is manually-operated for selectively disabling the detector circuit 32 to thereby turn off the intruder alert system as desired without effecting the normal operation of the telephone.

The transformer also includes induction coil S2 which is connected in series with resistor R1 and adjustable capacitor C1 which together form an adjustable oscillating circuit. This oscillating circuit is preadjusted and tuned to the frequency of the electrical click signal.

A filter 34, preferably a band-pass filter, is connected in cascade with the detector 32. Filter 34 comprises a first branch of an inductor S3 connected in series with a capacitor C2, a second branch of an inductor S4 connected in series with a capacitor C3, and a third branch of an inductor S5 connected in parallel with a capacitor C4. Filter 34 serves to pass only the desired frequency band of the click signals with minimum attenuation, and serves to greatly attenuate all other frequencies outside of the desired frequency band.

An electrical amplifier 36 is connected in cascade with the filter 34. Amplifier 36 comprises a transistor TR1 whose base is connected to inductor S4, whose collector is connected to a source of supply voltage (B+), and whose emitter is connected to ground through a resistor R2 connected in parallel with a capacitor C5. Amplifier 36 serves to increase the magnitude of the filtered electrical click signal to a level sufficient to actuate the relay alarm circuit which has its input terminals 40, 42 respectively connected to the collector and emitter terminals of the transistor TR1.

Figure 2:
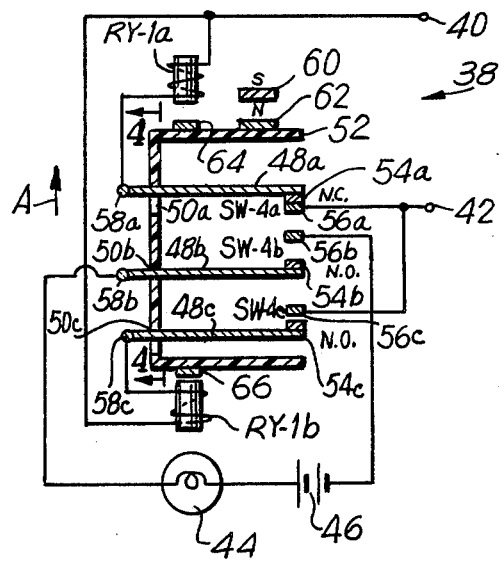
FIG. 2 is a partially sectioned circuit diagram representation of the relay alarm circuit of FIG. 1 in one operative state.
Figure 3:
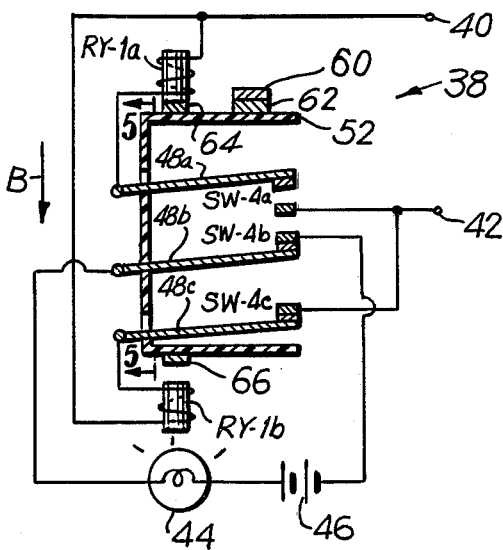
FIG. 3 is a representation analogous to FIG. 2 and shows the relay alarm circuit of FIG. 1 in another operative state.

As best shown in FIGS. 2 and 3, the relay alarm circuit 38 comprises a first relay core RY-1a connected in series with relay switch SW-4a between input terminals 40 and 42; a second relay core RY-1b also connected in series with relay switch SW-4c between input terminals 40 and 42; and an indicating circuit having a visually-indicating lamp 44 connected in series with both battery 46 and with relay switch SW-4b. Relay switches SW-4a, 4b, 4c have movable electrically-conducting contact members 48a, 48b, 48c, respectively, and these contact members extend through respective apertures 50a, 50b, 50c formed in a U-shaped armature of electrically-insulating synthetic plastic material. Contact member 48a has a contact portion 54a which is normally in electrically-conductive contact with contact portion 56a. Contact member 48b has a contact portion 54b which is normally out of electrically-conductive contact with contact portion 56b. Contact member 48c has a contact portion 54c which is normally out of electrically-conductive contact with contact portion 56c. Contact members 48a, b, c, are respectively mounted for pivoting movement at hinge portions 58a, 58b, 58c, at their end regions remote from their associated contact portions. The relay alarm circuit 38 further comprises a permanent magnet or magnetic latch 60; latch portion 62 fixedly mounted on armature 52 in juxtaposed relationship with latch 60; and magnetically-attractable relay elements 64, 66 both fixedly mounted on armature 52 in juxtaposed relationship with relay cores RY-1a, 1b, respectively.

The operation of the intruder alert system is as follows:

The user of a primary extension telephone 20 first positions switch SW3 in the illustrated open position. This disables the intruder alert system 10 during dialing of the digits of the phone number, because the signals generated during such dialing may interfere with the alarm system. Upon completion of the dialing, the switch SW3 is manually moved to the closed position. Any digit dialing coming from the other extension phones will not affect the system 10, because switch SW1 and SW2 are open during this time, and dialing impulses will not reach the system 10. Switches SW1 and SW2 will close only after the hand receiver is lifted off-hook, which action will also cut-off the ringing current.

With the switch SW3 in closed position, electric impulse-type signals derived from the phone communication will pass through the induction coil S1. These signals generally lie in the telephone audio frequency band of about 250 to about 3000 Hz. Variations on the order of 0.6 to about 1.2 volts in the amplitude of these signals have been observed due to sensitivity of the transmitter 24 to its physical position, and to vibration or shocks. Variations on the order of 1 volt in signal amplitude also occurs due to instability of the source current and voltage.

The aforementioned speech-derived signals and the noise signals are inductively coupled to the detector circuit 32 which, as noted above, is pretuned to the frequency band of the click signals. Thus, the detector circuit acts as a first selector of any click signal which may be produced by an intruder as a result of counter electro-motive forces being generated by removing and/or replacing a hand receiver relative to its cradle.

The filter 34 further screens the frequency of the click signal from the aforementioned speech-derived and noise signals. The filter 34 is tuned to provide maximum attenuation to the passage of signals other than the click signals. Amplifier 36 amplifies the click signals to an amplitude sufficient to actuate the relay cores RY-1a, 1b of the relay alarm circuit 38.

After a first click signal has been detected, filtered and amplified, this first click signal is inputted to terminals 40, 42. In response, relay core RY-1a is energized due to the normally-closed position of switch SW-4a, whereas relay core RY-1b is not energized due to the normally-open position of switch SW-4c. Energization of relay core RY-1a causes relay element 64 to be magnetically attracted to the latter, thereby displacing armature 52 and contact members 48a, b, c, from their positions as illustrated in FIG. 2 in direction of arrow A to their positions as illustrated in FIG. 3. During such displacement, switch SW-4b closes and completes the indicating circuit, thereby permitting lamp 44 to light and indicating to an on-line user that an intruder has removed a hand receiver from an auxiliary extension phone. Also during such displacement, switch SW-4c closes to thereby ready relay core RY-1b for the next subsequent energization; and switch SW-4a opens to thereby cut-off relay core RY-1a from being energized the next time a click signal is detected.

After the click signal has dissipated and no longer exists, the armature 52 is held in the FIG. 3 position due to latch portion 62 being constantly held by magnetic attraction with permanent magnet 60. Hence, the lamp 44 will remain lit for as long as the hand receiver of the intruder phone is off-the-hook, thereby giving the on-line user a continuous indication of the presence of the intruder.

When the intruder replaces the hand receiver to an on-hook position, a second click signal is successively generated, detected, filtered, amplified and again inputted to terminals 40, 42. This time the relay core RY-1b is energized and causes relay element 66 to be magnetically attracted to the relay core RY-1b. Hence, armature 52 and contact members 48a, b, c, are displaced in direction of arrow B back to the FIG. 2 position. During this latter displacement, switch SW-4b opens and extinguishes lamp 44 to thereby indicate to an on-line user that the intruder has replaced the hand receiver; switch SW-4a closes to thereby ready relay core RY-1a for the next subsequent energization; and switch SW-4c opens to thereby cut-off relay core RY-1b from being energized the next time a click signal is detected.

After the second click signal has dissipated and no longer exists, the relay core RY-1b is de-energized and the relay element 66 is no longer held by the latter. Element 66 may sit loosely directly on relay core RY-1b, or relay element 66 may be spaced slightly from relay core RY-1b as illustrated in FIG. 2 due in part to the inherent resilience contained in the springy metal material of contact member 48b which urges armature 52 a slight distance along the direction of arrow A, but short of making contact between relay element 64 and relay core RY-1a. The relay alarm circuit is now ready for the next cycle.

Figure 4:
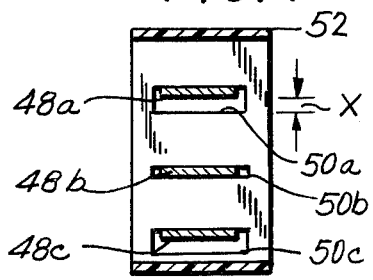
FIG. 4 is an enlarged sectional view as taken along line 4—4 of FIG. 2.
Figure 5:
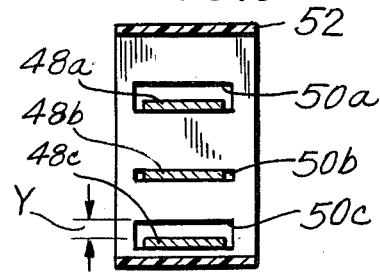
FIG. 5 is an enlarged sectional view as taken along line 5—5 of FIG. 3.

In accordance with another feature of the invention, a timing arrangement is provided for actuating the lamp 44 to the lit or alarm state of FIG. 3 prior to the end of the duration of the first click signal, and for actuating the lamp 44 to the unlit or non-alarm state of FIG. 2 prior to the end of the duration of the second click signal. As best shown in FIGS. 4 and 5, rectangular apertures 50a and 50c in armature 52 are enlarged relative to aperture 50b in the direction of displacement of the armature. Contact member 48b fits snugly within aperture 50b so that as soon as the armature 50, 52 moves, the contact member 48b moves at the same time. Contact member 48a fits with clearance within aperture 50a and, as shown in FIG. 4, contact member 48a is located at the upper portion of aperture 50a. Thus, when armature 52 is displaced from its FIG. 2 position, switch SW-4b will close prior to the time that it takes for switch SW-4a to open due to the fact that armature 52 has to move through a distance x before contact member 48a is moved. The widened aperture 50a thereby insures that the lamp 44 will light prior to the time that the click signal dissipates.

In analogous manner, aperture 50c is enlarged and, as shown in FIG. 5, contact member 48c fits with clearance within aperture 50c at the lower portion of the latter. Thus, when armature 52 is displaced from its FIG. 3 position, switch SW-4b will open prior to the time that it takes for switch SW-4c to open due to the fact that armature 52 has to move through a distance y before contact member 48c is moved. The widened aperture 50c thereby insures that the lamp 44 will be extinguished prior to the time that the second click signal dissipates.

It will be understood that each of the elements described above, or two or more together, may also find a useful application in other types of constructions differing from the types described above.

While the invention has been illustrated and described as embodied in a telephone intruder alert system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A telephone intruder alert system for indicating the subsequent interconnection and disconnection of an extension telephone with a telephone line to a current on-line user, comprising:
   a. means for detecting electrical click signals which are respectively generated in response to interconnection and disconnection of an auxiliary extension telephone with a telephone line; and
   b. means responsive to the detection of the electrical click signals for indicating to a current on-line user of a primary extension telephone which is already interconnected with the telephone line of the subsequent interconnection and disconnection of the auxiliary extension telephone, whereby the on-line user is alerted to the presence of an intruder on the telephone line.

2. The telephone intruder alert system of claim 1; and further comprising switching means for selectively disabling said detecting means.

3. The telephone intruder alert system of claim 1, wherein said detecting means includes a detector circuit, and means for electromagnetically coupling the generated electrical click signals to said detector circuit.

4. The telephone intruder alert system of claim 1, wherein said detecting means includes means for filtering the electrical click signals from other extraneous signals, and means for electrically amplifying the filtered electrical click signals.

5. The telephone intruder alert system of claim 1, wherein said indicating means includes an actuatable indicator, and means for actuating said indicator between alarm and non-alarm states in which said indicator respectively indicates the start and termination of the interconnection of the auxiliary extension telephone in response to respective detection of a first and a subsequent second electrical click signal.

6. The telephone intruder alert system of claim 5, wherein both said first and said second electrical click signals are of limited time duration; and further comprising timing means for actuating said indicator to said alarm state prior to the end of the duration of said first electrical click signal, and to said non-alarm state prior to the end of the duration of said second electrical click signal.

7. A telephone intruder alert system for indicating the subsequent interconnection and disconnection of an extension telephone with a telephone line to a current on-line user, comprising:
   a. means for detecting electrical click signals of limited time duration which are respectively generated in response to interconnection and disconnection of an auxiliary extension telephone with a telephone line, said detecting means including
      a detector circuit,
      means for electromagnetically coupling the generated electrical click signals to said detector circuit,
      means for filtering the coupled electrical click signals from other extraneous signals, and
      means for electrically amplifying the filtered electrical click signals;
   b. means responsive to the detection of the electrical click signals for indicating to a current on-line user of a primary extension telephone which is already interconnected with the telephone line of the subsequent interconnection and disconnection of the auxiliary extension telephone, said indicating means including
      an actuatable indicator,
      means for actuating said indicator between alarm and non-alarm states in which said indicator respectively indicates the start and termination of the interconnection of the auxiliary extension telephone in response to respective detection of a first and a subsequent second electrical click signal; and
   c. timing means for actuating said indicator to said alarm state prior to the end of the duration of said first electrical click signal, and to said non-alarm state prior to the end of the duration of said second electrical click signal.

8. A telephone intruder alert system of claim 7; and further comprising switching means for selectively disabling said detecting means.

9. A telephone intruder alert system of claim 7, wherein said indicator is a visually-indicating electrical lamp.

* * * * *